United States Patent [19]

Spiller

[11] Patent Number: 4,666,719

[45] Date of Patent: May 19, 1987

[54] **ADMIXTURE OF A *LACTOBACILLUS BREVIS* AND A *SACCHAROMYCES DAIRENSIS* FOR PREPARING LEAVENING BARM**

[76] Inventor: Monica A. Spiller, 1052 Ray, Los Altos, Calif. 94022

[21] Appl. No.: 795,205

[22] Filed: Nov. 5, 1985

[51] Int. Cl.$^4$ .................. A21D 2/36; A21D 8/04; A23L 1/105
[52] U.S. Cl. ......................................... 426/18; 426/61; 426/62; 435/42; 435/253; 435/255
[58] Field of Search .............. 426/62, 18, 61; 435/42, 435/253, 255

[56] References Cited

U.S. PATENT DOCUMENTS

| | | | |
|---|---|---|---|
| 3,734,743 | 5/1973 | Kline et al. | 426/62 X |
| 3,891,773 | 6/1975 | Kline et al. | 426/61 |
| 3,963,835 | 6/1976 | Gryezka | 426/18 |
| 4,243,687 | 1/1981 | Kline | 426/62 |

OTHER PUBLICATIONS

Jago, The Technology of Bread Making, 1921, Bakers' Helper Co., Chicago, pp. 236–239.
Matz, Bakery Technology and Engineering, 2nd Ed., 1972, Avi: Westport, Conn., p. 214.
Buchanan et al, Bergey's Manual of Determinative Bacteriology, 8th Ed., 1974, The Williams & Welbuis Co., Balt., pp. 529, 550–551, 577.
Kreger-van Rij, The Yeasts, 1984, Elsevier: Amsterdam, pp. 379–395.

*Primary Examiner*—Joseph Golian
*Attorney, Agent, or Firm*—Ciotti & Murashige

[57] ABSTRACT

A culture contained in a whole grain barm for effecting natural leavening of breads, baked goods and the like is disclosed. The culture contains a newly identified Lactobacillus sp. bacteria named *Lactobacillus brevis*, atypical and a nonmaltose-digesting Saccharomyces sp. yeast preferably *Saccharomyces dairensis*. The isolation of Lactobacillus sp. and Saccharomyces sp. organisms and their use in leavening processes are also disclosed.

5 Claims, No Drawings

ADMIXTURE OF A *LACTOBACILLUS BREVIS* AND A *SACCHAROMYCES DAIRENSIS* FOR PREPARING LEAVENING BARM

BACKGROUND OF THE INVENTION

1. Field of the Invention

This invention concerns a culture which can bring about fermentation and natural leavening in breads and related baked goods. In particular, this invention relates to whole grain barms embodying this culture; the culture itself which contains a bacterial and a yeast species; the components of the culture as isolates; a method for initiation and reproducibly producing the barms and the culture that they contain; and methods for the use of the barms, the culture and the isolates.

2. Prior Art

The term "barm" is often used to refer to a brewing liquid containing a yeast. The term has also been used to refer to a "starter" for naturally leavened baked goods. Natural leavening and its use in baking and other food preparation processes are ancient concepts which predate the baker's yeast and/or baking powder leavening commonly in use today. Natural leavening is now understood to rely upon the action of various native organisms in flour and other foods such as milk to generate a leavening gas by fermentation mechanisms.

Natural leavening has numerous advantages. For one, goods prepared with natural leavening often have a superior taste and excellent aroma. For another, leavening is carried out without adding chemical agents so that completely natural and hygienic baked goods result. Natural leavening is compatible with most common flours—including whole grain flours—so that an especially nutritious product is possible. Natural leavening processes generally generate acidic materials such as lactic and acetic acids in the baked product. This acidity prevents spoilage of the product and thus enhances its storage life without resort to added chemical preservatives.

Notwithstanding these advantages, the natural leavening process has fallen into disfavor. Its principal present application in the United States is in the leavening of "San Francisco sourdough" French bread products. One problem presented by classic natural leavening has been a lack of reproducibility, with different grains and flours giving different results from day to day. Another problem that has interfered with the broad use of the process has been a lack of stability such that the starter often must be refreshed or rebuilt several times a day. A third problem is a lack of consistent activity. The "starters" often die or become inactive with time.

These three problems are reflected in the common practices of commercial sourdough bakers of having a preferred "secret" starter sponge or barm which has been "used for generations" and often of rebuilding or renewing this sponge two or three times daily.

References to natural leavening processes and materials include Bakers Digest, (1970) Vol 44, No. 2, pp 48–50 in which Kline, Sugihara and McCready describe the nature and history of the San Francisco sourdough bread leavening and baking process. In this article they describe the practice of continual renewal and describe the use of conventional white bread flours in the process. In a second article appearing at Bakers Digest, (1970) Vol 44, No. 2, pp 51–53, 56–67 Sugihara, Kline and McCready describe the microbiological aspects of the same process. They show that the classic starter sponges contain a yeast *Saccharomyces exiguus* or its nonspore-forming equivalent *Torulopsis holmii* and, occasionally, *Saccharomyces inusitatus*, which is now regarded as a strain of baker's yeast, *Saccharomyces cerevisiae*. They also reported that bacteria are present in starter sponges as well. This reference compares these bacteria with those found in rye bread starters. Tentatively, the bacteria is described as a Lactobacillus. In *Applied Microbiology* (March 1971) Vol 21, No. 1, p 456–458, Sugihara et al give further preliminary classification information about the bacteria. In *Applied Microbiology* (June 1972) Vol 23, No. 6, pp 1153–1159 Ng reports studies which further classify the bacteria as a heterofermentative Lactobacillus. Ng also reports in *Applied and Environmental Microbiology*, Vol 31, No. 3, March 1976, pp 395–398 that the bacteria has been further characterized and named Lactobacillus sanfrancisco.

Patent references include U.S. Pat. No. 558,393 of Kellogg which shows a process for production of a cooked grain product which is treated at temperatures between 110° F. and 140° F. or between 40° F. and 60° F. to prevent fermentation; U.S. Pat. No. 1,041,629 of Jaquet which discloses that grain, when wet under certain conditions, will ferment spontaneously; U.S. Pat. No. 1,910,967 of Ruckdeschel which describes a two step method for making rye bread in which an acid fermentation is favored in a first step and a yeast rise is favored in the second; U.S. Pat. No. 2,322,940 of Kirby et al which shows several species of Lactobacillus as acid-forming components of bread souring materials; U.S. Pat. No. 2,476,242 which describes a process for preparing a white rye flour and yeast-based sour flour which is storable; U.S. Pat. No. 2,857,280 of Williams et al which describes a frozen pancake batter which contains a Lactobacillus aand/or a nonpathogenic bacterial species of the Lactic group of the genus Streptococcus and a Saccharomyces or Torulopsis yeast; two U.S. Pat. Nos. 3,891,773 and 3,734,743 of Kline et al, which essentially cover the material of their above-described papers on the microorganisms in sourdough french bread; U.S. Pat. No. 3,963,835 which describes the use of Lactobacillus plantarum in baking products; and U.S. Pat. No. 4,021,581 of Sing which discloses a process for rapidly and economically growing Lactobacillus sanfrancisco.

STATEMENT OF THE INVENTION

A new fermentation culture which is an effective active component of a storage-stable natural leavening barm has now been found. This culture comprises a Lactobacillus sp. bacteria and a nonmaltose-digesting Saccharomyces yeast. A newly identified Lactobacillus, *Lactobacillus brevis,* atypical which will be described in detail below and is presently deposited at the American Type Culture Collection and designated ATCC 53295, is the preferred bacteria. Saccharomyces dairensis is the preferred yeast. The strain of *Saccharomyces dairensis* isolated from a whole wheat barm is presently deposited at the American Type Culture Collection and designated ATCC 20782. In another aspect, this invention provides storage-stable whole grain barms useful as natural leavening agent starters in baked goods and similar food products. These barms contain the new fermentation culture in a slurry of whole grain flour in wheat. In a further aspect, this invention provides a process by which the culture of this invention can be initiated and reproducibly grown. In yet additional aspects, this invention provides the mixture of Lactobacillus sp. and nonmaltose-digesting Saccharomyces sp. and the components of this mixture as isolates. In addition, this invention provides uses for the isolated Lactobacillus sp. alone and together with the nonmaltose-digesting Saccharomyces sp.

DETAILED DESCRIPTION OF THE INVENTION

The Culture

The culture of this invention, at times referred to as "The Culture", includes a symbiotic mixture of two components—a Lactobacillus sp. bacterial component and a nonmaltose-digesting Saccharomyces sp. yeast component.

The Bacterial Component

The bacterial component includes a rod-shaped bacteria which, based on its properties, is believed to be a Lactobacillus sp. This bacterial component has the following characteristics: it is in the form of rods generally 2-3$\mu$ in length and about 0.5$\mu$ in diameter with peritrichous flagella; it is gram positive; it is catalase negative; it is a facultative anaerobe; it is mesophyllic; it produces a pH of about 3.5-4.0 in a barm and generally attains a concentration of from about $10^8$ to about $10^{10}$ organisms per mL in a barm when fully grown out; it can be grown on an agar medium containing yeast and malt extracts, hydrolysed casein, a nonionic surfactant (Tween 80), and lactic acid, when the colonies are translucent and less than 1 mm in diameter. It is capable of fermenting glucose and galactose, and particularly maltose. The fermentation product generated by the bacteria is mainly D(−) lactic acid.

A sample of this bacteria has been supplied to the ATCC for permanent deposit and has been accorded ATCC number 53295. The ATCC is instructed that this bacteria shall be made available to the public by ATCC throughout the life of this patent. The ATCC has applied the name, Lactobacillus brevis, atypical to this preferred bacillus. Other bacteria useful in the practice of this invention would be characterized as being Lactobacillus capable of digesting maltose and producing a final pH in the barm of from 3.0 to 4.5 and of being compatible with and capable of growing with a nonmaltose-digesting Saccharomyces yeast.

The Yeast Component

The yeast component of the culture is a nonmaltose-digesting Saccharomyces species. The Saccharomyces genus of yeasts is described by D. Yarrow at pages 379-395 of the book The Yeasts, edited by Kreger-van Rij (Elsevier, 1984). Saccharomyces cerevisiae (common baker's yeast) and S. kluyveri do not fall into the class of preferred yeasts as these yeasts ferment maltose thereby depriving the bacteria of a food supply. Preferred Saccharomyces are S. dairensis, S. servazzii, S. telluris, S. unisporis, and S. exiguus. These are all known accepted species within the genus. However, with the exception of S. exiguus, which is already known for its use in San Francisco sourdough French bread, their use in natural leavening is believed to be new. Of these species S. dairensis is preferred.

These preferred Saccharomyces sp., with the exception of S. exiguus, can be further distinguished by their lack of ability to ferment sucrose and by their requirements for vitamins. S. exiguus is similar to S. cerevisiae and S. kluyveri in that it can ferment sucrose and may adapt to or be able to grow in media lacking certain vitamins.

These yeast species can be identified by the characteristics set out in Kreger-van Rij, The Yeasts (supra).

The Culture's Composition

The culture comprises viable cells of Lactobacillus sp. and Saccharomyces sp. The culture can be maintained as a suspension of these organisms in a nutrient medium. A typical nutrient mixture could comprise water, malt extract, yeast extract, hydrolyzed casein, Tween-80 (nonionic surfactant), and lactic acid.

This culture can be stored just above freezing. The culture can be frozen if treated by organism-nonlethal drying processes such as freeze drying, and put into this dry form for storage.

The Isolated Organisms

The Lactobacillus and the nonmaltose-digesting Saccharomyces can be isolated from the culture and reproduced using conventional microbiological techniques known to those skilled in the art. In one such technique, the culture is subjected to repeated dilution and the various dilutions are applied to agar plates carrying nutrients for one or the other or both of the organisms, individual colonies of one or both of the organisms are identified and sampled and the samples so taken are grown out on additional plates and thereafter expanded to yield the desired organisms as isolates. These isolates are generally initially prepared as suspensions. They can, if desired, be frozen or dried as described with reference to the unisolated cultures themselves.

Initiating the Culture and Whole Grain Barm

It has been found that with certain whole grain flours, Lactobacillus sp. and Saccharomyces sp., as well as other bacteria and/or yeasts, may be present in the flour. The initiation of growth of the desired Lactobacillus and the desired Saccharomyces can be favored by mixing the flour with water and at somewhat elevated temperature such as above 25° C. but below about 45° C., especially from about 35° C. to about 43° C. Preferably the whole grain flour contains at least a portion of ground sprouted grains—such as a quarter or more of said materials. It is believed that these sprouted grains contribute nutrients which promote germination and growth of the desired microorganisms. These elevated temperatures give spores a chance to germinate and lead to the preferential generation of the symbiotic mixture of desired bacteria and yeast. It is believed that the yeast and the bacteria use different feedstocks both of which are present in the culture medium. In addition, the Lactobacillus sp. generates significant acidity which can have the effect of preventing the growth of other undesired yeasts and/or bacteria.

Production of the Leavening Barm

The leavening barm comprises the culture in admixture with a slurry of flour in water. It is considered important that the flour be at least in part a whole grain flour as the culture appears to be substantially specific for whole grain flours.

The barm slurry may contain from about 5:1 v/v to about 1:2 v/v proportions of water and flour. Preferably, it contains about 1:1 v/v proportions. The barm contains an effective leavening concentration of the culture species which is a concentration of at least $10^6$ bacteria per mL of barm, preferably at about $10^8$ bacteria per mL and about $10^7$ yeast cells per mL. This concentration of microorganisms can be achieved by allowing the culture to grow in the barm at a temperature of about 10° C. to about 37° C., preferably from about 15° C. to about 30° C. for 12 to 48 hours. At temperatures at or above about 45° C., growth of the bacterial component of the culture is inhibited. When these concentrations of microorganisms are present, the barm can be stored at refrigerator temperature (approximately 4° C.) for at least a month without the necessity of periodic rebuilding, as is required for sourdough french bread starters. Thereafter, the barm can be used at room temperature and caused to react with and grow in a mixture of fresh flour, at least a part of which is whole grain flour, and water.

Use of the Barm

The barm contains the culture in admixture with flour and water and is generally a slurry. It can be used as a natural leavening agent in breads, rolls, biscuits, doughnuts, bagels, pizza dough, crackers, pancakes and the like. Such uses can be carried out in several manners. For one, the barm can be refreshed—that is, warmed to room temperature in the presence of added water and fresh flour, at least a part of which is a whole grain flour, for from 2–12 hours—to bring about growth of fresh organisms prior to use. Alternatively, the barm can be used without refreshment.

The recipes for using this barm can vary widely. In one simple recipe a barm bread is made from barm, whole grain flour and water in the following approximate proportions by volume:

2 parts barm,
2 parts water,
5–6 parts whole grain flour (as needed to produce a dough consistency.

These three ingredients are mixed just sufficiently to produce a dough consistency. The dough is divided and formed into loaf size portions and proofed at room temperature for 1–2 hours depending upon the degree of leavening and flavor development desired. The loaves are then lightly kneaded and formed into their final shape. After resting for a further 10–20 minutes, the loaves are baked. Typical baking conditions are 50 minutes at 200° C. for a 0.75 kg doughpiece.

If desired, the added water can be replaced in whole or in part by ingredients such as eggs, milk, oil, buttermilk, whey, yogurt, cream, butter or the like and a portion of the flour (0.2 parts) can be replaced by malted grain flour such as from barley or soft wheat, to produce a softer texture, and to enhance the supply of maltose. Salt and flavorings include sweetening, fruits or spices can also be added, if desired. If sucrose is added as a sweetener, it will not be consumed by the organisms of the barm as they do not ferment sucrose.

In an alternative recipe, barm (4 parts) can be mixed with 2–3 parts of whole grain flour to give an extra flavorful dough which is then proofed and baked as above. This mixture can also be rolled, shaped and baked without proofing to yield crackers or bread sticks or the like.

Pancakes and other batter-based products can be formed using, for example:

2 parts barm,
1–2 parts water or milk or eggs, etc.
1–2 parts whole grain flour these ingredients are mixed together and used as a conventional batter might be used.

The invention will be further described with reference to the following example. This is provided solely to exemplify the invention and is not to be construed as limiting the scope of the invention.

EXAMPLE

A whole wheat flour was prepared by milling wheat berries to a flour. This maltose-containing flour was mixed with water and ground sprouted wheat berries and allowed to stand lightly covered at about 105° F. ($\sim$41° C.) for 24 hours. This caused *Lactobacillus brevis*, atypical (ATCC #53295) and

*Saccharomyces dairensis* (ATCC #20782) to preferentially grow and the mixture to ferment to yield a barm. The identity of these organisms was verified using well known microbiological techniques set forth above. (When this initiation was repeated, the barm was discarded if other majority organisms were found to be present.)

The barm was stored at 4° C. for 1–2 months and retained its viability and activity throughout the period.

A sample of the barm was refreshed by adding whole wheat flour and water and allowing it to ferment at ambient room temperature for two hours to yield a refreshed barm.

The Lactobacillus bacteria and the Saccharomyces yeast in the barm (also referred to herein as sourdough batter or SD) were then isolated as follows: In this isolation and identification, standard techniques and materials were employed. One nonstandard material which was specially prepared was a sourdough bacterial and yeast medium "SDB medium" which was formulated as a broth and as an agar medium. It contained the following in water:

Malt extract broth, 2%
Yeast extract, 0.3%
10% aqueous nonionic surfactant (Tween 80), ) 0.3 mL/100 mL medium
Bacto-tryptone, 0.6%
20% Lactic acid, 0.1 mL/100 mL
Agar, 1.5% (omitted for broth medium)

Pure cultures of the bacteria and the yeast were isolated as follows:

A series of dilutions of SD into 0.1% peptone were made. These were
I 10%
II 0.1%
III. 0.001%
IV. 0.00001% and
V. 0.0000001%.

Spread plates were made using 0.1 mL portions of I through V, as well as undiluted SD, on SDB agar medium. Incubation was at ambient room temperature for 2 or more days. Isolated bacterial and yeast colonies identified on the spread plates so produced were then streaked onto SDB plates and slants. These new plates were then grown at ambient temperature for about 2 days to give the isolated bacteria and yeast.

The isolated bacteria and yeast so obtained were then characterized. The bacteria was found to have the following characteristics: it is in the form of rods generally 2–3$\mu$ in length and about 0.5$\mu$ in diameter with peritrichous flagella; it is gram positive; it is catalase negative; it is a facultative anaerobe; it is mesophyllic; it produces a pH of about 3.5–4.0 in barm and generally attains a concentration of from about $10^8$ to about $10^{10}$ organisms per mL in barm when fully grown out; it can be grown on the SDB medium; and it is capable of fermenting glucose, galactose, and maltose. The fermentation product generated by the bacteria is mainly D(−) lactic acid.

The yeast was characterized as *Saccharomyces dairensis* having among its properties the ability to ferment glucose and galactose, but not maltose or sucrose and having a requirement for vitamins.

The active culture distributed in the refreshed barm was then employed as a natural leavening agent in proportions by volume as follows: It was added to 1–2 parts of water per 2 parts of barm and about 5–6 parts of whole grain flour. These ingredients were mixed, proofed at room temperature for two hours, kneaded, and formed into loaf shapes and allowed to stand for an additional 15 minutes. Thereafter the loaves were baked at about 200° C. until done. The resulting bread was characterized by having a rich flavor; by being very strong in texture such that it could be cut into very thin slices; by having significant acidity as reflected in its taste and in its ability to be self preserving; as being nutritionally superior because its acidity most likely enhances the availability of nutritionally important minerals from the phytates present in the whole grain flour and because its whole grain flour provides important fiber and wheat germ to the diet.

A sample of this barm was stored without refreshment in a refrigerator at about 4° C. for about two months. Thereafter, a sample of this material was used in a repeat of the baking process just described. It performed essentially identically with the original barm, indicating that the culture had retained its activity during the two month storage even without refreshment.

A sample of the isolated bacteria and the isolated yeast are grown out and stored. These stored isolates are then used as fermentation agents. In one such case a portion of the bacteria and a sample of the yeast are combined, mixed with a maltose-containing flour, such as a whole wheat flour, and water and held at room temperature to initiate a barm. This barm can be used in the same way as the continuously formed barm described above to yield excellent quality naturally leavened baked goods. These organisms are believed to be active with a wide variety of whole grains and their flours—for example with wheat, rye, barley, oats, amaranth, millet, corn, rice or the like.

In another use, the bacteria and yeast can be used as fermentation agents to modify grains themselves to enhance their nutritional value as poultry or animal feed or the like.

What is claimed is:

1. A fermentation culture for use in preparing storage-stable whole grain flour containing natural leavening barm consisting essentially of an admixture of
   a. isolated viable cells of *Lactobacillus brevis* (atypical) (ATCC 53295), and
   b. isolated nonmaltose-digesting *Saccharomyces dairensis* (ATCC 20782).

2. A storage-stable natural leavening barm comprising in admixture, water, whole grain flour and an effective fermentation-causing amount of the fermentation culture of claim 1.

3. A process for initiating a culture capable of yielding storage-stable natural leavening barm which comprises forming a slurry of whole wheat flour and sprouted cereal grain in water, the whole wheat flour being the source of viable cells of *Lactobacillus brevis* (atypical), (ATCC (53295) and *Saccharomyces dairensis,* (ATCC 20782), and maintaining said slurry at a temperature of about 41° C. to effect preferential growth of said Lactobacillus and said Saccharomyces and thereafter holding the slurry at a temperature below about 41° C.

4. A process for effecting natural leavening of a maltose-containing baked product which comprises including with the ingredients for the preparation of a baked product an effective leavening amount of the leavening barm of claim 2.

5. The product produced by the process of claim 3.

* * * * *